Patented Mar. 20, 1951

2,545,498

UNITED STATES PATENT OFFICE 2,545,498

2-[N-(b-DIMETHYLAMINOMETHYL) - N - (4-METHOXYBENZYL) - AMINO] - THIAZOLE AND PROCESS FOR MAKING SAME

Clarence W. Sondern, Mendham, and Philip J. Breivogel, Glen Ridge, N. J., assignors to White Laboratories, Incorporated, Newark, N. J., a corporation of New Jersey No Drawing. Application May 19, 1947, Serial No. 749,080

2 Claims. (Cl. 260—302)

This invention relates to new compounds, particularly to the new compound, 2-(N-b-dimethylaminoethyl) - N - (4 - methoxybenzyl)-amino)-thiazole and salts thereof having antihistamine properties, and to intermediates and methods useful in its preparation.

It is known that, fundamentally, clinical manifestations of many allergies are due to tissue liberation of histamine brought about by the offending allergens. In the attempt to relieve such clinical manifestations, it has been proposed to administer compounds to the allergic individual which antagonize or counteract the physio-pathological effects of histamine. Such compounds are referred to as anti-histamine compounds.

Although some progress has been made in this field, there has heretofore been discovered no compound which is highly effective and which is reasonably free from undesirable toxic effects. The advantages of a compound or product which could be administered safely and conveniently to an individual suffering from an allergy due to histamine and which could successfully overcome this condition are apparent.

It is therefore, an object of the present invention to provide a new and useful therapeutic agent.

An additional object is to provide a therapeutic agent for combatting allergic conditions.

A further object is to provide a substance possessing a low degree of toxicity and suitable for therapeutic use.

It has now been found that the heretofore undescribed compound, 2-(N-(b-dimethylaminoethyl) - N - (4 - methoxybenzyl) - amino) - thiazole, and its salts with acids are effective agents in combatting allergic conditions due to histamine when administered in dosage forms such as tablets, capsules, elixir, syrup, or tincture. One way of preparing the compound, as well as certain valuable intermediate compounds, is illustrated by the following reactions.

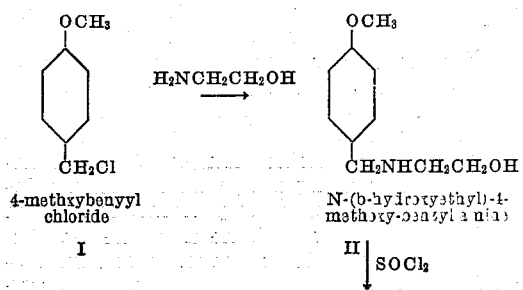

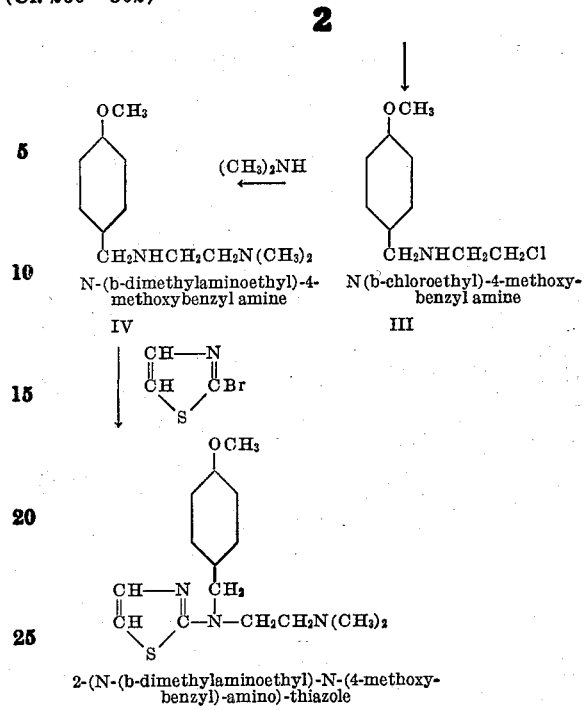

The free thiazole compound has the structural formula

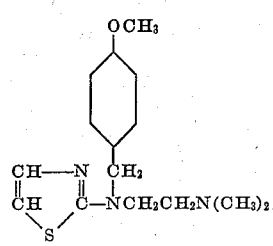

It is formed readily by reacting together a 2-halothiazole, e. g., 2-chlorothiazole or 2-bromothiazole, and N - (b - dimethylaminoethyl) - 4-methoxybenzyl amine in the presence of a dehydrohalogenating agent, such as pyridine or an excess of the amine. Following the condensation, the product can be isolated in any convenient manner, e. g., by distilling the dehydrohalogenating agent, alkalizing the residue, extracting with ether and distilling the extract in vacuo.

2 - (N - (b - dimethylaminoethyl) - N - (4-methoxybenzyl) -amino) -thiazole is a light brown substance boiling at 180° to 182° C. at a pressure of 2.0 millimeters of mercury. It forms well-defined crystalline salts with acids, such as hydrochloric, hydrobromic, sulfuric, acetic, benzoic and propionic acids. It forms a monohydrochloride melting at 166° to 168° C.

The intermediate N-(b-dimethylaminoethyl)-4-methoxybenzyl amine can be formed readily in a number of ways, as by reacting together 4-methoxybenzyl amine and b-dimethylaminoethyl chloride or by condensing 4-methoxybenzyl chloride with b-dimethylaminoethyl amine. A preferred method for the formation of N-(b-dimethylaminoethyl) - 4 - methoxybenzyl amine comprises first condensing 4-methoxybenzyl chloride with b-aminoethanol to form N-(b-hydroxyethyl)-4-methoxybenzyl amine and converting this to N-(b-chloroethyl)-4-methoxybenzyl amine, e. g., with the aid of thionyl chloride. The N-(b-chloroethyl)-4-methoxybenzyl amine is then reacted with dimethyl amine to form the hydrochloride of N-(b-dimethylaminoethyl)-4-methoxybenzyl amine. The free N-(b-dimethylaminoethyl)-4-methoxybenzyl amine can be isolated readily from the hydrochloride by treating it with an aqueous alkali, extracting the mixture with ether and distilling. Other ways of recovering the free amine will be apparent to those familiar with the art.

The intermediate compound, N-(b-hydroxyethyl)-4-methoxybenzyl amine has not been described previously. This compound is a colorless viscous liquid boiling at 142° to 143° C. at a pressure of 3 millimeters of mercury. It has a specific gravity at 25° C. of 1.1016 and a refractive index $N_D^{25}$ 1.5425. It forms crystalline salts with acids, the hydrochloride melting at 110.5° to 111.5° C.

The condensation of 4-methoxybenzyl chloride with b-aminoethanol can be carried out by stirring the compounds together, e. g., in alcoholic solution at a slightly elevated temperature. A substantial excess of the amino compound can be used to advantage. Satisfactory results have been obtained my refluxing gently an alcoholic solution of one molecular proprotion of 4-methoxybenzyl chloride and from about 3 to about 8 molar proportions of b-ethanol amine. N-(b-hydroxyethyl)-4-methoxybenzyl amine can be recovered in high yield from the mixture by adding sufficient concentrated aqueous sodium hydroxide or other alkali to render the mixture strongly alkaline, filtering off any crystallized salts and distilling most of the alcohol. The residue can then be fractionally distilled in vacuo and the N-(b-hydroxyethyl)-4-methoxybenzyl amine collected in substantially pure form. Further purification of the compound can be effected, if desired, by conversion to the hydrochloride and recrystallization of the later from 95 per cent alcohol, or a mixture of ethanol and ethyl acetate.

The conversion of N-(b-hydroxyethyl)-4-methoxybenzyl amine to the corresponding chloroethyl compound is effected readily by treating the compound, usually in the form of its hydrochloride, with thionyl chloride. Chloroform or other liquid inert under the reaction conditions can be used as a diluent for the reaction mixture. The reaction can be carried out conveniently by dissolving one molecular proportion of the hydroxyethyl compound in chloroform, saturating the mixture with dry hydrogen chloride and, while stirring, adding slowly somewhat more than one molecular proportion of thionyl chloride. After heating the mixture for a short time the excess thionyl chloride and most of the chloroform can then be vaporized and the hydrochloride of N-(b-chloroethyl) - 4 - methoxybenzyl amine recovered as a substantially pure crystalline product by stirring the residue with acetone, filtering and washing the crystals with acetone. The dry hydrochloride is a white crystalline substance melting at 203° to 204° C. and is soluble in water and hot alcohol. It can be recrystallized, if desired, from alcohol or from a mixture of anhydrous alcohol and ethyl acetate.

The free N-(b-chloroethyl)-4-methoxybenzyl amine can be obtained from the hydrochloride by alkalizing the latter with aqueous sodium hydroxide, extracting with ether, drying the ethereal solution with potassium carbonate and distilling. N-(b-chloroethyl) - 4 - methoxybenzyl amine can be collected as a separate fraction consisting of a light yellowish to colorless liquid.

The condensation of dimethyl amine with N-(b-chloroethyl)-4-methoxybenzyl amine can be carried out by adding the hydrochloride of the latter to an alcoholic or aqueous alcoholic solution of an excess of dimethyl amine and stirring the mixture. The temperature usually rises to from about 30° to about 50° C. and stirring can be continued at this temperature. Satisfactory results have been obtained using from 3 to 7 molecular proportions of dimethyl amine for each molecular proportion of the hydrochloride. The reaction is usually complete in from one half to five hours.

N-(b - dimethylaminoethyl) - 4 - methoxybenzyl amine can be recovered from the reaction mixture by distilling the excess dimethyl amine and most of the alcohol, alkalizing the distillation residue with aqueous sodium hydroxide and extracting the alkaline mixture, e. g., with ether. After drying the ethereal solution, e. g., with potassium carbonate, it can be distilled in vacuo and the N-(b-dimethylaminoethyl)-4-methoxybenzyl amine collected as a fraction boiling at 89° to 92° C. at 0.4 millimeter pressure and having a specific gravity at 25° C. of 0.9892 and an index of refraction $N_D^{25}$ 1.5155. The yield is substantially quantitative. The substance as thus prepared is practically pure but it can be purified further, if desired, by recrystallizing the hydrochloride, e. g., from a mixture of ethyl acetate and anhydrous ethanol. The dihydrochloride is a crystalline substance melting at 198.5° to 199° C.

The condensation of a 2-halothiazole with N-(b-dimethylaminoethyl)-4-methoxybenzyl amine is effected readily by mixing the halothiazole and the amine together with a dehydrohalogenating agent, such as pyridine, picoline, quinoline or preferably an excess of the N-(b-dimethylaminoethyl)-4-methoxybenzyl amine and refluxing the mixture. Sufficient dehydrohalogenating agent, and usually an excess, is included in the reaction mixture to absorb or combine with all of the hydrogen halide formed during the condensation. Inert diluents may be included in the reaction mixture, if desired. The reaction is carried out conveniently at from about 120° to about 160° C., preferably at from about 130° to 150° C., and is usually substantially complete in from three to eight hours. The product can then be recovered in any suitable manner. One convenient way of recovering the product when the dehydrohalogenating agent is pyridine, consists in distilling most of the pyridine from the reaction mixture, adding sufficient aqueous sodium hydroxide solution to the distillation residue to render it strongly alkaline and extracting the resulting alkaline mixture, e. g., with ether. The extract is dried, e. g., with anhydrous sodium carbonate, and the ether or other extractant removed by distillation. The residue can then be distilled in vacuo and the desired fraction collected separately. A corresponding procedure can be used when an excess of N-(b-dimethylaminoethyl)-4-methoxybenzyl amine is used as the dehydrohalogenating agent.

The basic compound thus obtained may, if desired, be purified further by conversion to the picrate and recrystallization of the latter from methanol or other suitable solvent. The purified picrate is then decomposed by dissolving it in anhydrous alcohol and adding alcoholic hydrogen chloride. Upon concentrating the solution and adding acetone, the monohydrochloride of 2-(N-(b-dimethylaminoethyl)-N-(4-methoxybenzyl)-amino)-thiazole is obtained. Purification can also be effected by recrystallizing the monohydrochloride, e. g., from a mixture of ethyl alcohol and ethyl acetate. The free base can be obtained readily and in highly purified form by decomposing the hydrochloride with aqueous alkali, extracting the alkaline mixture, e. g., with ether, and drying and distilling the extract in vacuo.

The new free amino compounds of the present invention are represented by the generic formula

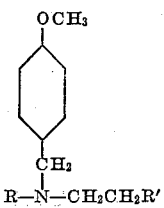

R—N—CH₂CH₂R' wherein R may be hydrogen or the thiazolyl-2 radical and R' may be a hydroxyl or dimethylamino radical, or a halogen, such as chlorine, bromide or iodine.

The free amino compounds form crystalline salts with acids, such as hydrochloric, hydrobromic, sulfuric, benzoic, acetic, butyric and naphthoic acids. When R' represents the dimethylamino radical diacid salts can be formed, such as the dihydrochloride or the dibenzoate. Diacid salts involving two different acids can also be formed if desired, such as the monohydrochloride monobenzoate of N-(b-dimethylaminoethyl)-4-methoxybenzyl amine.

The crystalline salts of the free amino compounds with acids just referred to can be prepared in a number of ways. They can be prepared readily by dissolving the amine in anhydrous ethanol and adding a sufficient amount of the desired acid. Upon diluting the mixture with acetone the salt of the amine is precipitated in crystalline form. The crystalline salts can be recrystallized, suitably from a mixture of ethanol and ethyl acetate.

This application is a continuation-in-part of a copending application, Serial No. 720,317, now U. S. Patent 2,519,325, filed January 4, 1947.

Certain advantages of the invention are apparent from the following examples which are given by way of illustration only and are not to be construed as limiting.

*Example 1.—N-(b-hydroxyethyl)-4-methoxybenzyl amine*

A mixture was prepared consisting of 366 grams of 2-aminoethanol and 150 milliliters of 95 per cent ethanol. The mixture was heated at 80° to 85° C. and 152 grams of p-methoxybenzyl chloride was added over a period of one hour with rapid stirring. Heating at 80° to 85° C. was continued for an additional one-half hour and the mixture was then cooled to 30° C. Eighty-five milliliters of 40° Bé. sodium hydroxide solution was added and the mixture was stirred for one-half hour, filtered to remove sodium chloride and then distilled at 20 millimeters pressure until the vapor temperature reached 130° C. The pressure was then reduced to 3 millimeters and the fraction distilling between 142° and 143° C. was collected separately. This fraction weighed 133 grams and was practically pure N-(b-hydroxyethyl)-4-methoxybenzyl amine. The product was a colorless, viscous liquid having a specific gravity of 25° C. of 1.1016 and a refractive index $N_D^{25}$ 1.5425.

*Example 2.—N-(b-hydroxyethyl)-4-methoxybenzyl amine hydrochloride*

One equivalent proportion of N-(b-hydroxyethyl)-4-methoxybenzyl amine was dissolved in anhydrous ethanol and one equivalent proportion of hydrogen chloride was added in the form of an alcoholic solution. The mixture was diluted with ether and the crystalline hydrochloride of N-(b-hydroxyethyl)-4-methoxybenzyl amine which separated was recovered by filtering, washing with ether and drying. The yield was substantially theoretical and the short, white needles melted at 110.5° to 111.5° C.

Anal. Calc'd for $C_{10}H_{16}O_2NCl$: Cl, 16.29
Found: Cl, 16.34

*Example 3.—N-(b-chloroethyl)-4-methoxybenzyl*

A solution of 199 grams of N-(b-hydroxyethyl)-4-methoxybenzyl amine in 1350 milliliters of chloroform was stirred rapidly at 35° C. and saturated with dry hydrogen chloride gas. The mixture was then warmed to about 55° C. and 186 grams of thionyl chloride added over a period of about 4 hours. The mixture was refluxed gently during the latter portion of the addition. After refluxing for an additional one hour the excess thionyl chloride and most of the chloroform were removed by distillation in vacuo. The residue from the distillation was cooled to about 25° C. and mixed thoroughly with 1000 milliliters of acetone and the fine, white crystalline hydrochloride of N-(b-chloroethyl)-4-methoxybenzyl amine which separated was recovered by filtering, washing with 200 milliliters of cold acetone and drying at 50° C. The yield of this product was almost theoretical based on the N-(b-hydroxyethyl)-4-methoxybenzyl amine used. The product was recrystallized from anhydrous ethanol and there was thus obtained 193 grams of the pure hydrochloride melting at 203° to 204° C.

Anal. Calc'd for $C_{10}H_{15}ONCl_2$: Cl, 30.0
Found: Cl, 29.8

*Example 4.—N-(b-chloroethyl)-4-methoxybenzyl amine*

Free N-(b-chloroethyl)-4-methoxybenzyl amine was obtained as a somewhat viscous, oily liquid by dissolving the hydrochloride as obtained in Example 3 in water and adding sufficient strong aqueous sodium hydroxide to render the mixture alkaline. The alkaline mixture was then extracted with ether, the ethereal solution dried with anhydrous potassium carbonate and the ether distilled. The residue was then distilled in vacuo and a fraction of N-(b-chloroethyl)-4-methoxybenzyl amine collected.

*Example 5.—N-(b-dimethylaminoethyl)-4-methoxybenzyl amine*

One hundred ninety three grams of N-(b-chloroethyl)-4-methoxy-benzylamine hydrochloride was added portion-wise over a period of about fifteen minutes and with rapid stirring to a mixture of 650 milliliters of aqueous 25 per cent dimethyl amine and 200 milliliters of ethanol. The temperature rose during the addition and was held at about 40° C. After the addition was complete, the mixture was allowed to stand for an additional eighteen hours at room temperature and then concentrated to 300 milliliters in vacuo. The residue was cooled to 25° C. and the base liberated by adding 175 milliliters of 40° Bé. sodium hydroxide solution. The base was extracted from the mixture with ether and the ether removed by distillation after drying over potassium carbonate. The oily residue was distilled in vacuo and the fraction boiling at 89° to 92° C. at 0.4 millimeters pressure was collected separately. This fraction weighed 158 grams and was practically pure N-(b-dimethylaminoethyl)-4-methoxybenzyl amine having a specific gravity of 0.9892 at 25° C. and a refractive index $N_D^{25}$ 1.5155. It was a clear colorless liquid.

*Example 6.—N-(b-dimethylaminoethyl)-4-methoxybenzyl amine dihydrochloride*

One equivalent proportion of N-(b-dimethylaminoethyl)-4-methoxybenzyl amine, prepared as in Example 5 was dissolved in anhydrous ethanol and two equivalents of hydrogen chloride dissolved in ethanol added. The mixture was heated to dissolve the precipitate and allowed to cool and crystallize. The crystals were recovered by filtering and recrystallized from a mixture of ethanol and ethyl acetate. The small white plates obtained melted at 198.5° to 199° C.

Anal. Calc'd for $C_{12}H_{22}ON_2Cl_2$: Cl, 25.22
Found: Cl, 25.27

*Example 7.—2-(N-(b-dimethylaminoethyl)-N-(4-methoxybenzyl)-amino)-thiazole*

A mixture of 38 grams of N-(b-dimethylaminoethyl)-4-methoxybenzyl amine and 14.7 grams of 2-bromothiazole was heated at 138° to 140° C. for 7.5 hours. The mixture was cooled to room temperature and dissolved in a mixture of 15 milliliters of concentrated aqueous hydrochloric acid and 100 milliliters of water. The dark colored solution thus obtained was extracted with ether to remove unchanged 2-bromothiazole. The aqueous acid solution was then decolorized with carbon, filtered, and made strongly alkaline by the addition of 30 milliliters of 40° Bé. sodium hydroxide. The free base was extracted with ether and the ethereal extract was dried with anhydrous potassium carbonate and heated to distill ether. The dark, oily residue remaining was distilled in vacuo and the fraction distilling at 180° to 182° C. at 2 millimeters pressure was collected separately. This fraction, which weighed 16.5 grams, consisted of practically pure 2-(N-(b-dimethylaminoethyl)-N-(4-methoxybenzyl)-amino)-thiazole.

*Example 8.—2-(N-(b-dimethylaminoethyl)-N-(4-methoxybenzyl)-amino)-thiazole monohydrochloride*

The 16.5 grams of 2-(N-(b-dimethylaminoethyl)-N-(4-methoxybenzyl)-amino)-thiazole obtained in Example 7 was dissolved in 10 milliliters of anhydrous ethanol and mixed with a solution of an equivalent quantity of hydrogen chloride in anhydrous ethanol. The hydrochloride was then precipitated from the solution by the addition of acetone. The hydrochloride was recovered by filtering and washing with acetone and was then crystallized from a mixture of two parts of ethyl acetate and one part of anhydrous ethanol and then recrystallized from n-butanol. Upon drying the re-crystallized product there was obtained 5.5 grams of 2-(N-(b-dimethylaminoethyl)-N-(4-methoxybenzyl)-amino)-thiazole monohydrochloride in the form of fine, light-tan crystals melting at 166° to 168° C. The crystals were very soluble in water and ethanol and somewhat less soluble in N-butanol. The absorption spectrum of the hydrochloride showed a minimum at 243 mu and maxima at 28 mu and 267 mu.

Anal. Calc'd for $C_{15}H_{22}ON_3SCl$; C, 54.94; H, 6.77; N, 12.82; S, 9.78; Cl, 10.81
Found: C, 54.84; H, 6.72; N, 12.85; S, 9.84; Cl, 11.08

We claim:
1. 2-(N-(b-dimethylaminoethyl)-N-(4-methoxybenzyl)-amino)-thiazole.
2. The method which includes: reacting N-(b-dimethylaminoethyl)-4-methoxybenzyl amine with a 2-halothiazole to produce 2-(N-(b-dimethylaminoethyl)-N-(4-methoxybenzyl)-amino)-thiazole.

CLARENCE W. SONDERN.
PHILIP J. BREIVOGEL.

REFERENCES CITED

The following references are of record in the file of this patent:

UNITED STATES PATENTS

| Number | Name | Date |
|---|---|---|
| 2,440,703 | Sondern et al. | May 4, 1948 |

FOREIGN PATENTS

| Number | Country | Date |
|---|---|---|
| 913,959 | France | Sept. 25, 1946 |

OTHER REFERENCES

Chemical Abstracts, vol. 40, page 1600, citing Bovet et al., Ann. pharm. franc., 2, 32 pp. (1944) (Supp. to No. 4).